May 21, 1974 R. W. PREVITE ET AL 3,812,076
METHOD OF ADDING SMALL AMOUNTS OF SOLID PARTICULATE
ADMIXTURES TO HYDRAULIC CEMENT COMPOSITIONS
Filed Feb. 20, 1973
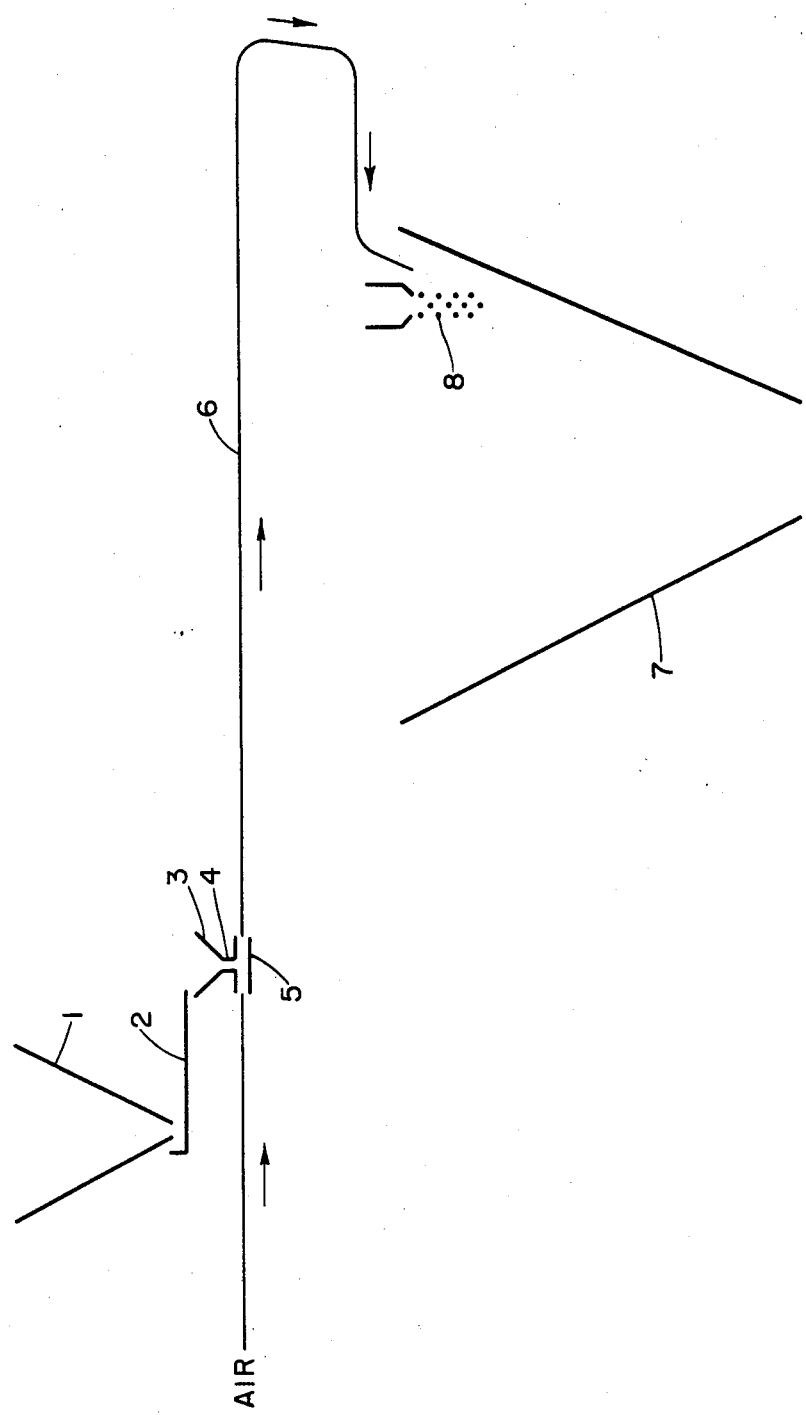

United States Patent Office 3,812,076
Patented May 21, 1974

3,812,076
METHOD OF ADDING SMALL AMOUNTS OF SOLID PARTICULATE ADMIXTURES TO HYDRAULIC CEMENT COMPOSITIONS
Robert W. Previte, Lawrence, and David Chin, Charlestown, Mass., assignors to W. R. Grace & Co., Cambridge, Mass.
Filed Feb. 20, 1973, Ser. No. 333,839
Int. Cl. C08g 51/04
U.S. Cl. 260—37 AL                                      15 Claims

ABSTRACT OF THE DISCLOSURE

Low addition rate, hygroscopic, difficult-to-dissolve, solid particulate admixtures for hydraulic cement compositions (e.g. polymers of ethylene oxide) are incorporated in the cement composition by a process wherein the desired amount to be added is first measured, the measured quantity introduced (e.g. by siphoning) to a moving confined stream of gas such as air which is under pressure to form a solid-gas mixture, transferring the solid-gas mixture to a mixing zone which is under a lower pressure, and releasing the mixture into the mixing zone along with at least one other component of the cement composition, preferably the aggregate component.

BACKGROUND OF THE INVENTION

This invention relates to a practical and efficient method of incorporating solid admixtures in hydraulic cement compositions such as portland cement compositions. More particularly, the present invention is directed to a commercially practical and efficient method of incorporating a comparatively small amount of a solid, particulate, hygroscopic, difficultly-dissolvable admixture in hydraulic cement compositions such as portland cement concrete.

Recently, high molecular weight polymers of ethylene oxide have been used in very small amounts as admixtures for hydraulic cement compositions such as portland cement concrete. The polymers are employed in finely divided form, i.e. the majority of the particles are less than about 500 microns in size. Such polymers, even at very low addition rates, greatly facilitate the flow of the wet, plastic cement mix through conventional pumping equipment. In effect, the polymer lubricates the mix and reduces the internal friction of the mix as well as the friction between the plastic mix and the pumplines.

The practical and efficient addition of such small amounts, e.g. less than about 1 percent by weight of the cement component, of the high molecular weight polymers to hydraulic cement compositions in the highly automated modern commercial mixing plants presents a unique problem. It is generally most desirable to supply chemical admixtures for hydraulic cement compositions on a commercial scale in the form of high solids-content, water based solution. Modern portland cement concrete mixing operations, for example, are largely automated and the dispensing of the proper amount of the admixture in the composition is most conveniently automated when the admixture is in liquid form. Low solids-containing liquid admixtures are economically impractical and require special attention in the plant due to the large amounts of water therein which must be carefully calculated as part of the total water added to the composition. Thus the moderately water soluble admixtures have generally been supplied on a commercial scale in solid powder form and usually dispensed manually. To meet the desire for automated dispensing, in some instances the powdered products have been dispensed in the mixing plant by way of a vibratory feeder.

The provision of the ethylene oxide polymeric admixtures in the form of water based solutions was found to be undesirable. Although quite water soluble, when contacted with water the solid resinous particles become instantly wetted, absorbing the water quickly and forming a cohesive gel about the surface of the particle. The cohesive particles tend to clump together forming agglomerates which are difficult to dissolve. In addition to this difficulty in forming the solution, the high molecular weight polymers at even low concentrations in water, form high viscosity solutions. Thus a liquid solution of the polymer would be an undesirable low solids commercial product, difficult to handle and transfer because of its high viscosity. Such a highly viscous solution would also be difficut, if not impossible, to meter out and dispense by present automated methods in the mixing plants.

The dispensing of the high molecular weight polymeric admixtures in solid particulate form was found to be likewise problematical. The polymer is hygroscopic and upon exposure to ambient air the particles start to lose their fluidity. Also, since only a comparatively small amount of the admixture is to be added to the concrete mix, e.g. from about 0.001 up to about 1%, most often between about 0.02 to about 0.5 percent by weight of the cement component, the effective dispersion of the solid particles throughout the comparatively large volume of concrete mix is of utmost significance. A thorough and effective dispersion of the polymeric particles throughout the mix is also highly important because of the peculiar behavior of the polymer when initially contacted by water, as mentioned above. If the polymeric particles are concentrated in a particular portion of the mix, the formation of the difficultly-dissolvable clumps upon contact by the mix water is more likely to occur. The formation of such clumps of the polymer upon contact by the mix water would be especially disadvantageous in the present instance since enough of the polymeric additive must be in solution throughout the plastic mix during the pumping of the concrete in order to facilitate the pumping operating which usually takes place soon after addition of the mix water. Concentration of the additive at only one point in the mix, or dissolution at a point subsequent to the pumping operation would obviously be of little benefit. Manual dispensing of the polymeric additive is, therefore, less practical and less efficient.

Automatic measuring and dispensing of the solid polymeric particles in the mixing plant by way of the previously employed vibratory feeder was found to be an inferior method of accomplishing this highly important dispersion of the polymeric additive throughout the entire volume of the concrete mix. Due to design limitations and the need for accessibility, vibratory feeders in most plants are usually required to be located near the edge of the large batching or weigh bins in modern mixing plants. In this even, the small amount of the solid particles gravitationally dispensed would tend to be concentrated at the edge of the mix. Such concentration of the solid admixtures previously dispensed by vibratory feeders was not of concern as in the present instance since such admixtures were added in much larger proportions and were not as difficult to dissolve as in the present polymeric additives.

SUMMARY OF THE INVENTION

A practical and efficient method has been found for dispensing, transferring, and effectively dispersing low addition rate, solid, particulate, hygroscopic, difficultly-dissolvable admixtures for hydraulic cement compositions, such as high molecular weight polymers of ethylene oxide. The method of the invention provides for easy conveyance and optimum dispersion of the relatively small amount of solid particles throughout the large volume of the composition mix and is easily and conveniently adapted into the modern automated mixing operations. The inventive method ideally enables measuring and dispensing of the solid particulate at a point remote from the mixing vessel and simple automated transfer of the measured quantity in dispersed form to the mixing vessel for effective dispersion therein. According to the method of the present invention the exact desired amount of the powdered admixture is measured from a supply source by any convenient metering means. The measured amount of powder is then introduced to a moving, confined stream of gas, for example air under pressure, for instance by siphoning the solid particles into the moving stream. The moving gas-solid mixture or dispersion formed is then conducted to the mixing vessel into which it is released along with at least one of the remaining components of the cement composition, for example, the aggregate component.

BRIEF DESCRIPTION OF THE DRAWING

The accompanying drawing is a diagrammatic representation of one embodiment of the present inventive process.

DESCRIPTION OF THE PREFERRED EMBODIMENT

In the accompanying drawing, the desired amount of the solid particulate admixture is measured and extracted from storage hopper 1 and deposited upon a vibratory feeder pan 2 of conventional design, for example, a "Syntron" Model F–T01 vibratory feeder. Such feeders generally comprise a flat, wide pan or trough which is vibrated electronically. The bottom of the pan is inclined and may have a slight taper or a groove in the center portion thereof. As the pan is vibrated, the solid particles are moved slowly in the desired direction. The length of time of vibration is calibrated with the amount of powder dispersed. The feeder pan 2 directs the measured amount of the powdered admixture into funnel 3 which is connected to a nipple 4. The bottom portion of the nipple is connected to the suction inlet of a conventional air jet syphon 5 through which air under pressure is directed as shown. One commercially available air jet syphon which has given satisfactory results is an "SK" Air Jet Syphon, FIG. 217 type, sold by the Schutte and Koerting Company. Air under pressure, e.g. about 30 to 100 p.s.i.g., preferably 40–60 p.s.i.g., enters the syphon's pressure nozzle and because of the internal configuration of the syphon, a high velocity jet is formed. This jet action creates a vacuum or suction in the funnel which causes the suction material, i.e. the powder, to be drawn into the body of the syphon where it is entrained by the air. Pipe 6 conducts the pressurized mixture of air and powder to weigh bin 7 where the solid particles are released into a falling curtain 8 of the aggregate employed in the cement mix.

The present inventive method offers several advantages. It is readily seen that the method is easiy automated and can be conveniently incorporated into existing mixing operations. The storage and metering devices can be located remote from the mixing vessel and situated in a place in the mixing plant readily accessible for refilling and maintenance. There is thus no bulky equipment above or adjacent the mixing vessel where space and accessibility is at a minimum. Also, the vacuum created through the funnel 3 assists in counteracting any reduction in fluidity of the hygroscopic polymeric particles due to exposure to the moisture in the ambient air.

Effective dispersion of the small amount of solid particles in the cement mix is promoted in the method of the invention in several aspects. A pressurized dispersion of gas and solid particles is initially formed, which upon release into the mixing bin, greatly expands by the sudden release into the lower atmospheric pressure surrounding the weigh bin. Also, the rate of flow of the material to the syphon can be adjusted to control the length of time over which the relatively small amount of solid additive is dispensed. This can be made to correspond with the overall addition time of one or all of the remaining components of the cement composition. In this manner, dispersion of the small volume of the solid particulate additive throughout the relatively large volume of the remaining aggregate, cement and water components is optimized.

Obviously, feeding devices or methods other than a vibratory feeder such as screw type feeders, continuous belts, etc., can be employed for measuring out and dispensing the additive to the funnel 3. Also, the admixture particles can be introduced to the moving air stream by methods other than siphoning, e.g., by a gravity feed device.

The powdered admixture can be added with the cement component instead of the aggregate as shown, or with both. In any event, it should not be added after the mix water has been added. While it is preferable to add the powdered admixture continuously and concurrently with the other ingredient or ingredients of the mix, such addition may be carried out sequentially with the other ingredient or ingredients, for example, by alternate additions of separate portions of each, and the phrase "along with" as employed herein and in the attached claims is intended to include such methods of addition.

Because of the hygroscopic nature of the ethylene oxide polymeric particles, it is preferred that the particles be initially mixed with an inert, high surface area, solid particulate material to prevent the particles from sticking together and to insure that the powdered admixture remains sufficiently fluid under high humidity conditions. Exemplary materials for this purpose include inert siliceous powders of silica, bentonite, talc, etc. Especially preferred for this use in the process of this invention is fumed silica.

In addition to insuring fluidity of the polymeric particles, it has been found that the inert, solid, particulate material, when used in sufficient amounts, assists in dispersing the polymeric additive in the cement mix. It is believed that the inert particles prevent rapid contact by the moisture usually present in the aggregate component and by the mix water and thus prevent the formation of the undesirable, difficult-to-dissolve agglomerates mentioned above. Fluidity of the ethylene oxide polymeric particles and the prevention of the formation of difficult to dissolve or undissolved agglomerates in the plastic cement mix, has been found to be assured even under relatively high humidity conditions, when at least about 2, preferably about 3.5 weight percent, of the high-surface area, inert particulate material is employed, based on the weight of the combined weight of polymer and inert particles.

In addition to dispensing and dispersing small amounts of polymers of ethylene oxide in powder form, the process of the invention can be employed to dispense and disperse small amounts of other powdered hygroscopic, difficultly-dissolvable additives such as hydroxyethylcellulose and methylcellulose, in hydraulic cement compositions other than portland cement such as high alumina, aluminite, "expensive," "blended," etc., cement compositions.

It is claimed:

1. The method of dispensing and dispersing a hydroscopic, difficulty-dissolvable, finely divided, solid particulate admixture selected from the group consisting of ethylene oxide polymers, hydroxyethylcellulose and methylcellulose in a hydraulic cement-aggregate composition, said admixture further containing an inert, high surface area, solid particulate material in sufficient quantity to prevent said hydroscopic particles from sticking together said method comprising the steps of measuring the desired predetermined amount of said solid admixture to be added, introducing the measured quantity of additive to a moving, confined stream of gas which is under pressure, transferring the resulting confined gas-solid mixture to a mixing zone for said composition which is under a lower pressure than said mixture, and releasing said confined, pressurized mixture of gas and admixture particles into said zone along with at least one other component of said cement-aggregate composition.

2. The method of claim 1 wherein said solid particulate additive is a polymer of ethylene oxide.

3. The method of claim 1 wherein the amount of solid particulate ranges between about 0.001 to 1 percent by weight of said cement.

4. The method of claim 1 wherein the admixture is introduced to said moving stream of gas by siphoning the admixture.

5. The method of claim 1 wherein said inert material is a siliceous powder.

6. The method of claim 1 wherein said mixture is released into a falling stream of said other component in said mixing zone.

7. The method of claim 1 wherein said mixing zone is under atmospheric pressure and said gas is under a pressure greater than atmospheric.

8. The method of claim 1 wherein said introduction of the measured quantity is regulated in a manner such that the solid-gas mixture is added to the vessel continuously over a period of time corresponding substantially to the period of addition of said other component.

9. The method of claim 1 wherein said inert material is selected from the group consisting of silica and bentonite.

10. The method of dispensing and dispersing about 0.001 to about 1 percent by weight based on the weight of the cement of a hydroscopic, difficultly-dissolvable, finely divided, solid particulate admixture selected from the group consisting of ethylene oxide polymers, hydroxyethylcellulose and methylcellulose in a hydraulic cement-aggregate composition, said admixture further containing an inert, high surface area, solid particulate material in sufficient quantity to prevent said hygroscopic particles from sticking together, said method comprising the steps of measuring the desired predetermined amount of said solid admixture to be added, introducing the measured quantity of additive to a moving, confined stream of gas which is under pressure, transferring the resulting confined gas-solid mixture to a mixing zone for said composition which is under a lower pressure than said mixture, and releasing said confined, pressurized mixture of gas and admixture particles into said zone along with at least one other component of said cement-aggregate composition.

11. The method of claim 10 wherein said admixture is a polymer of ethylene oxide and said cement is portland cement.

12. The method of dispensing and dispersing about 0.001 to about 1 percent by weight of a finely divided, solid, particulate polymer of ethylene oxide in a hydraulic cement-aggregate composition, said amount being based upon the weight of the cement, said method comprising the steps of mixing said admixture with from at least about 2 percent by weight based on the weight of the combined weight of polymer and inert particles of inert, high surface area, siliceous particulate solid material, measuring the desired amount of the resulting mixture to be added, siphoning the measured quantity into a moving, confined, stream of air which is under a pressure greater than atmospheric to form a solid-air mixture, transferring the solid-air mixture to a mixing zone for the cement-aggregate composition, and releasing the pressurized, confined, mixture of air and solid particles of ethylene oxide and siliceous material into a falling stream of said aggregate in the mixing zone.

13. The method of claim 12 wherein the amount of siliceous material employed is at least about 3.5 percent.

14. The method of claim 12 wherein said hydraulic cement is portland cement.

15. The method of claim 12 wherein said siliceous material is fumed silica.

References Cited

UNITED STATES PATENTS

| | | | |
|---|---|---|---|
| 2,646,975 | 7/1953 | Waldvogel | 259—149 |
| 2,726,136 | 12/1955 | Davis | 23—1 |
| 3,152,793 | 10/1964 | Goldberger | 259—146 |
| 3,425,601 | 2/1969 | Fry | 222—193 |
| 3,430,930 | 3/1969 | Kawecki | 259—146 |
| 3,456,924 | 7/1969 | Dietert | 259—148 |
| 3,473,788 | 10/1969 | Kelly | 259—149 |
| 3,592,363 | 7/1971 | Stout | 222—193 |
| 3,650,436 | 3/1972 | Barber | 222—70 |
| 2,912,041 | 11/1959 | Boggs | 264—121 |

FOREIGN PATENTS

| | | | |
|---|---|---|---|
| 696,774 | 10/1964 | Canada | 260—37 AL |

OTHER REFERENCES

Degussa Technical Bulletin No. 31 "Aerosil" for Improving the Flow Behavior of Powder Substances, 1968.

Union Carbide Corp. Brochure F-42933 "Polyox, Water Soluble Resin."

ALLAN LIEBERMAN, Primary Examiner

E. S. PARR, Assistant Examiner

U.S. Cl. X.R.

106—90, 97; 260—37 AL; 264—121